(12) United States Patent
Momono

(10) Patent No.: US 10,814,539 B2
(45) Date of Patent: Oct. 27, 2020

(54) PLASTICIZING DEVICE, INJECTION DEVICE, MOLDING APPARATUS, AND MANUFACTURING METHOD OF MOLDED PARTS

(71) Applicant: TOSHIBA KIKAI KABUSHIKI KAISHA, Tokyo (JP)

(72) Inventor: Masamichi Momono, Numazu (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 313 days.

(21) Appl. No.: 15/439,413

(22) Filed: Feb. 22, 2017

(65) Prior Publication Data

US 2017/0157822 A1    Jun. 8, 2017

Related U.S. Application Data

(63) Continuation of application No. PCT/JP2015/075927, filed on Sep. 11, 2015.

(30) Foreign Application Priority Data

Sep. 12, 2014 (JP) ................. 2014-186608
Sep. 11, 2015 (JP) ................. 2015-180176

(51) Int. Cl.
*B29C 45/34* (2006.01)
*B29C 45/62* (2006.01)
(Continued)

(52) U.S. Cl.
CPC .............. *B29C 45/54* (2013.01); *B29B 7/426* (2013.01); *B29B 7/429* (2013.01); *B29B 7/60* (2013.01);
(Continued)

(58) Field of Classification Search
CPC ......... B29C 45/54; B29C 45/62; B29C 45/18; B29B 7/426; B29B 7/429; B29B 7/60; B29B 7/7471; B29B 7/90
See application file for complete search history.

(56) References Cited

U.S. PATENT DOCUMENTS 5,358,680 A * 10/1994 Boissonnat ......... B29C 45/1816
264/177.2
5,401,154 A * 3/1995 Sargent ................... B29B 11/10
425/114
(Continued)

FOREIGN PATENT DOCUMENTS

CN    101039791    9/2007
CN    103991203    8/2014
(Continued)

OTHER PUBLICATIONS

Machine translation via google patents of CN101039791A, 14 pages. (Year: 2019).*
(Continued)

*Primary Examiner* — Xiao S Zhao
*Assistant Examiner* — Emmanuel S Luk
(74) *Attorney, Agent, or Firm* — DLA Piper LLP US

(57) ABSTRACT

1. A plasticizing device includes a barrel including a resin material supply port portion and a fiber supply port portion which is formed on a distal side from the resin material supply port portion; and a screw that comprises a shaft body and a flight, and is received in the barrel. The barrel is disposed with a posture in which its axial line intersects a gravitational direction. A maximum length of an opening in the barrel of the fiber supply port portion along an axial direction of the barrel is 1 time or more and 2 times or less as much as a pitch of the flight disposed in a portion of the screw which faces the opening in the barrel of the fiber
(Continued)

supply port portion in a direction perpendicular to the axial line of the barrel.

8 Claims, 11 Drawing Sheets

(51) Int. Cl.
| | | |
|---|---|---|
| B29C 45/18 | (2006.01) | |
| B29B 7/60 | (2006.01) | |
| B29B 7/42 | (2006.01) | |
| B29C 45/54 | (2006.01) | |
| B29B 7/90 | (2006.01) | |
| B29B 7/74 | (2006.01) | |
| B29K 101/12 | (2006.01) | |

(52) U.S. Cl.
CPC .............. *B29B 7/90* (2013.01); *B29C 45/18* (2013.01); *B29C 45/62* (2013.01); *B29B 7/7471* (2013.01); *B29K 2101/12* (2013.01)

(56) References Cited

U.S. PATENT DOCUMENTS

| | | | |
|---|---|---|---|
| 5,653,534 A | 8/1997 | Matsumoto et al. | |
| 6,202,947 B1 | 3/2001 | Matsumoto et al. | |
| 6,444,153 B1* | 9/2002 | Shah .................. | B29C 45/1816 264/211.21 |
| 7,390,118 B2* | 6/2008 | MacDonald .......... | B29C 45/581 366/80 |
| 7,691,305 B2* | 4/2010 | Sutton ................. | B29C 45/0005 264/211 |
| 2002/0020932 A1* | 2/2002 | Kapfer .................... | B29C 31/08 264/40.1 |
| 2002/0079607 A1* | 6/2002 | Hawley .................. | B29C 48/38 264/136 |
| 2004/0238990 A1* | 12/2004 | Hermann ............... | B29C 70/50 264/102 |
| 2005/0083105 A1 | 4/2005 | Matsuura et al. | |
| 2006/0083105 A1* | 4/2006 | MacDonald .......... | B29C 45/581 366/80 |
| 2006/0101768 A1 | 5/2006 | Watson et al. | |
| 2006/0103045 A1 | 5/2006 | O'Brien-Bernini et al. | |
| 2006/0261509 A1* | 11/2006 | Lustiger ................ | B29B 7/90 264/143 |
| 2007/0007685 A1 | 1/2007 | Gleich et al. | |
| 2007/0245666 A1 | 10/2007 | Watson et al. | |
| 2016/0009010 A1* | 1/2016 | Kariya ............... | B29C 45/1816 264/328.18 |
| 2017/0015036 A1* | 1/2017 | Kariya ................ | B29C 45/0005 |
| 2017/0266846 A1* | 9/2017 | Oda .......................... | B29B 7/46 |
| 2018/0099434 A1* | 4/2018 | Okazaki .................. | B29C 31/02 |
| 2019/0152104 A1* | 5/2019 | Baba .................... | B29C 45/1866 |

FOREIGN PATENT DOCUMENTS

| | | |
|---|---|---|
| DE | 33 09 007 A1 | 9/1984 |
| GB | 1 151 964 A | 5/1969 |
| JP | S59-184635 | 10/1984 |
| JP | S60-141519 | 7/1985 |
| JP | H08-142120 | 6/1996 |
| JP | H08-197580 | 8/1996 |
| JP | H10-180823 | 7/1998 |
| JP | H11-116818 | 4/1999 |
| JP | 2003-053811 | 2/2003 |
| JP | 3509238 | 3/2004 |
| JP | 2007-015382 | 1/2007 |
| JP | 2008-515682 | 5/2008 |
| JP | 2013-208779 | 10/2013 |
| JP | 2013-208866 | 10/2013 |
| WO | WO 2006-055398 | 5/2006 |

OTHER PUBLICATIONS

Machine translation via google patents of CN103991203B, 7 pages (Year: 2019).*
Machine translation via google patents of JPH08197580A, 5 pages (Year: 2019).*
International Search Report (with English Translation) issued in PCT/JP2015/075927 dated Nov. 2, 2015.
Written Opinion issued in PCT/JP2015/075927 dated Nov. 2, 2015.
English Language Abstract and Translation of JP 2007-015382 published Jan. 25, 2007.
English Language Abstract and Translation of JP S60-141519 published Jul. 26, 1985.
English Language Abstract and Translation of JP S59-184635 published Oct. 20, 1984.
English Language Abstract and Translation of JP H10-180823 published Jul. 7, 1998.
English Language Abstract and Translation of JP H11-116818 published Apr. 27, 1999.
English Language Abstract and Translation of JP 2008-515682 published May 15, 2008.
Decision of Patent Grant (with English Translation) issued in JP 2016-006483 dated Oct. 4, 2016.
Japanese Office Action (with English Translation) issued in JP 2015-180176 dated Nov. 17, 2015.
English Language Abstract and Translation of JP 2013-208866 published Oct. 10, 2013.
English Language Abstract and Translation of JP 2013-208779 published Oct. 10, 2013.
English Language Abstract of JP 2003-053811 published Feb. 26, 2003.
English Language Abstract and Translation of JP H08-197580 published Aug. 6, 1996.
International Preliminary Report on Patentability issued in PCT/JP2015/075927 dated Mar. 14, 2017.
English Translation of the Written Opinion issued in PCT/JP2015/075927 dated Nov. 2, 2015.
India Office Action issued in Application No. 201717005735 dated Jan. 22, 2019.
Chinese Office Action issued in CN 201580048275.5 dated Jul. 2, 2018.
English Language Abstract of CN 103991203 published Aug. 20, 2014.
English Language Abstract of CN 101039791 published Sep. 19, 2007.
Chinese Office Action issued in Application No. 201580048275 dated Apr. 10, 2019.
German Office Action issued in Application No. 11 2015 004 156.7 dated Sep. 30, 2019.
Indian Office Action issued in Application No. 201717005735 dated Dec. 4, 2019.

* cited by examiner

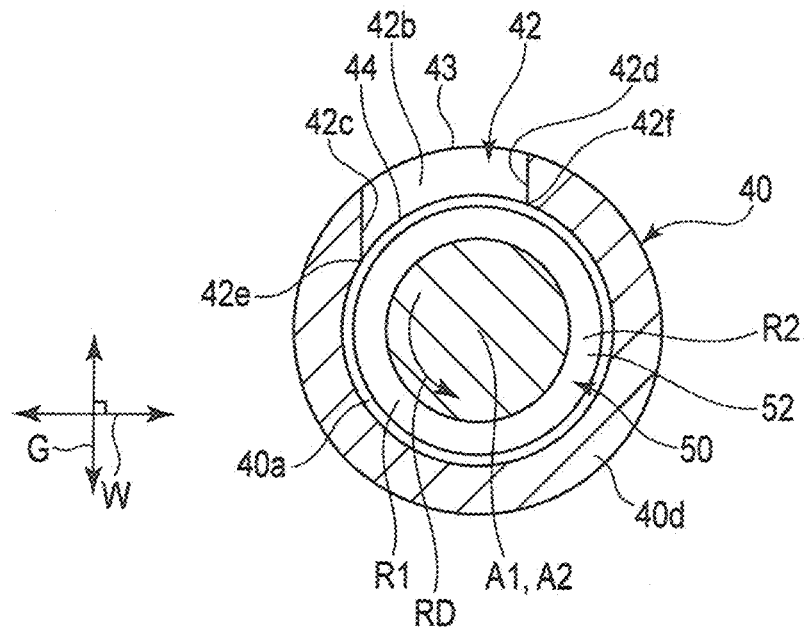
F I G. 4
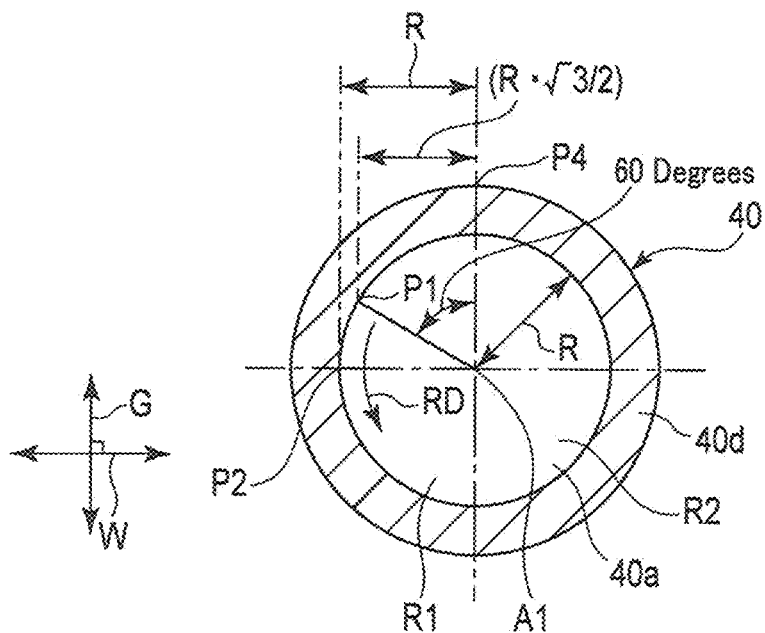
F I G. 5

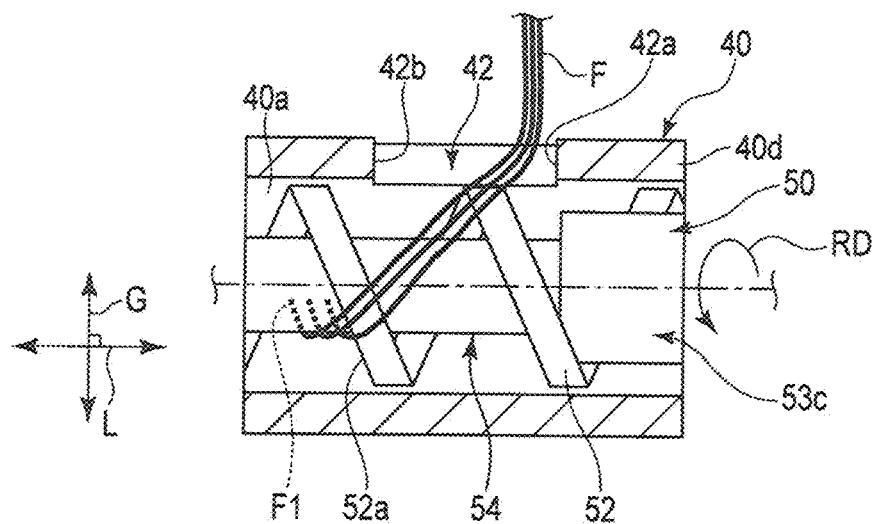
F I G. 10
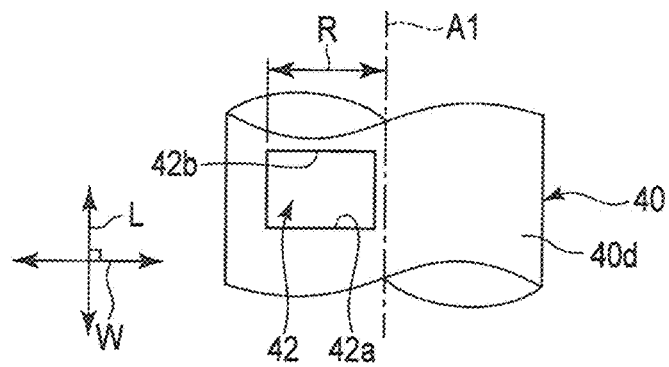
F I G. 11
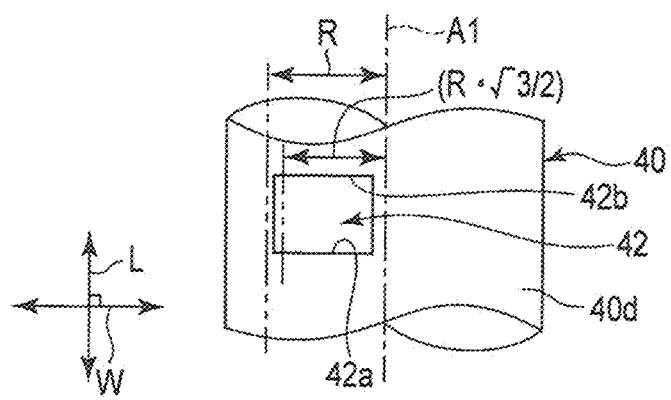
F I G. 12

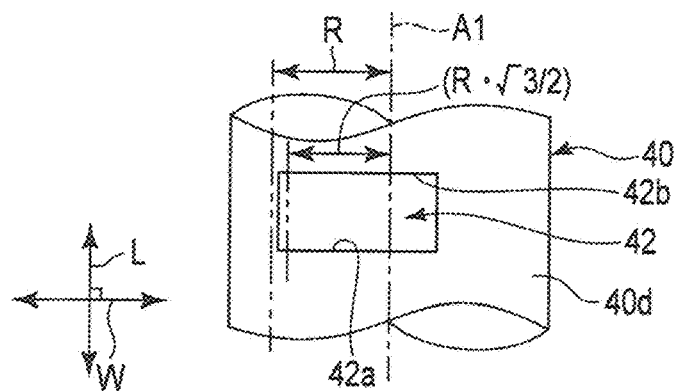
F I G. 13
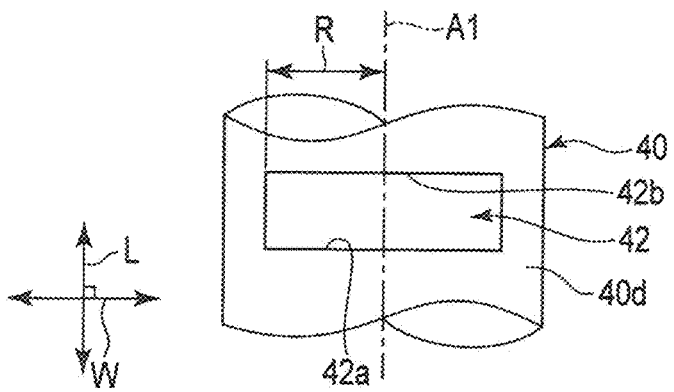
F I G. 14
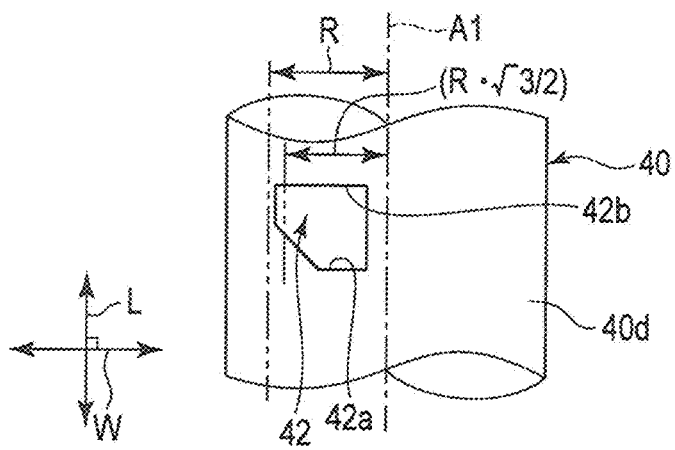
F I G. 15

PLASTICIZING DEVICE, INJECTION DEVICE, MOLDING APPARATUS, AND MANUFACTURING METHOD OF MOLDED PARTS

CROSS-REFERENCE TO RELATED APPLICATIONS

This is a Continuation Application of PCT Application No. PCT/JP2015/075927, filed Sep. 11, 2015 in Japanese.

This application is based upon and claims the benefit of priority from prior Japanese Patent Applications No. 2014-186608, filed Sep. 12, 2014, and No. 2015-180176, filed Sep. 11, 2015, the entire contents of which are incorporated herein by reference

BACKGROUND OF THE INVENTION

1. Field of the Invention

The present invention relates to a plasticizing device to knead a resin and a fiber, an injection device, a molding apparatus, and a manufacturing method of molded parts.

2. Description of the Related Art

In injection molding, a resin material is used as a parent material, and this parent material is kneaded with a reinforcing fiber such as a carbon fiber or a glass fiber to form a molten resin. Then, the molten resin is injected into a mold, thereby improving strength or rigidity of molded parts. When the molten resin is kneaded, the reinforcing fiber is uniformly dispersed in the resin.

A molding apparatus to perform such injection molding has, for example, the mold, a clamping device to clamp the mold, and an injection device to inject the molten resin into the mold (e.g., see Patent Literature 1). The injection device has a plasticizing section (a plasticizing device) which melts the resin material and kneads this resin material and the reinforcing fiber, thereby forming the molten resin, and an injecting section to inject the molten resin into the mold.

The plasticizing section has, for example, a barrel having an inner hole, a screw received in the inner hole of the barrel to rotate in the inner hole, a heater attached to an outer peripheral surface of the barrel, and others.

The barrel has a supply port for the resin material which is formed in, for example, a portion on a proximal side of the barrel and to which the resin material in the form of pellets is supplied, and a supply port for the reinforcing fiber which is formed separately from the supply port for the resin material and to which the reinforcing fiber is supplied.

The reinforcing fiber is, for example, a longitudinal thread and is disposed in a wound state around a bobbin. The reinforcing fiber is wound around the molten resin that spirally flows in a valley portion of the screw which rotates in the barrel, and is accordingly pulled into the barrel.

In the plasticizing section having such a constitution, the reinforcing fiber supplied from the supply port for the reinforcing fiber to the resin material is kneaded with the resin material supplied from the supply port for the resin material into the inner hole of the barrel while the resin material is molten, whereby the molten resin is formed, and is then pushed out to the injecting section.

The injecting section performs a measuring operation of measuring the molten resin including the fiber supplied from the plasticizing device, and an injecting operation of injecting the molten resin into the mold.

Patent Literature 1: Jpn. PCT National Publication No. 2008-515682

The above-mentioned molding apparatus has such problems as mentioned below. That is, when variation is generated in a pull-in amount of a reinforcing fiber to be pulled into a barrel per unit time, variation is generated in an amount of the reinforcing fiber per unit volume of a molten resin molten in the barrel, in other words, unevenness is generated in a dispersed state of the reinforcing fiber in the molten resin, and as a result, there is the possibility that physical properties such as strength and rigidity of molded parts vary.

As a cause for the generation of the variation in the pull-in amount of the reinforcing fiber to be pulled into the barrel per unit time, for example, it is considered that, when the reinforcing fiber is pulled into the barrel, the reinforcing fiber comes in contact with an edge of a support port for the reinforcing fiber to generate a pull-in resistance, or the reinforcing fiber hits a corner of the supply port, thereby changing a tensile force that acts on the reinforcing fiber.

BRIEF SUMMARY OF THE INVENTION

An object of the present invention is to provide a plasticizing device, an injection device, a molding apparatus, and a manufacturing method of molded parts in which it is possible to manufacture the molded parts which are uniform in physical properties such as strength and rigidity.

A plasticizing device of the invention includes a barrel comprising a resin material supply port portion which is formed in a peripheral wall portion and to which a resin material is supplied, and a fiber supply port portion which is formed on a distal side from the resin material supply port portion in the peripheral wall portion and to which a continuous fiber is supplied; and a screw that comprises a shaft body, and a flight of a spiral shape formed integrally on a peripheral surface of the shaft body to have a predetermined pitch, and is received in the barrel, wherein the barrel is disposed with a posture in which its axial line intersects a gravitational direction, and a maximum length of an opening in the barrel of the fiber supply port portion along an axial direction of the barrel is 1 time or more and 2 times or less as much as a pitch of the flight disposed in a portion of the screw which faces the opening in the barrel of the fiber supply port portion in a direction perpendicular to the axial line of the barrel.

In a preferable embodiment of the invention, in a planar view of the fiber supply port portion when the fiber supply port portion is seen in the gravitational direction, one end of the opening of the fiber supply port portion in a width direction perpendicular to the axial direction is located between a position distant as much as the distance $R(\sqrt{3}/2)$, in which R is an inner diameter of the barrel, from the axial line in the width direction and a position distant as much as the distance R from the axial line in the width direction, including these two positions, in a range where a rotating direction of the screw around the axial line becomes a downward direction along the gravitational direction.

In a preferable embodiment of the invention, in the planar view of the fiber supply port portion when the fiber supply port portion is seen in the gravitational direction, the one end of the opening of the fiber supply port portion in the width direction is located at the position distant as much as the distance R from the axial line in the range where the rotating direction of the screw around the axial line becomes the downward direction along the gravitational direction.

In a preferable embodiment of the invention, in the planar view of the fiber supply port portion when the fiber supply port portion is seen in the gravitational direction, the other end of the fiber supply port portion in the width direction is located in a range where the rotating direction of the screw around the axial line becomes an upward direction along the gravitational direction.

In a preferable embodiment of the invention, the screw comprises a supplying section, a compressing section, a measuring section, a fiber pull-in section, and a fiber kneading section, and the sections are arranged in order from a proximal end of the screw toward a distal end thereof, the fiber pull-in section faces the opening in the direction perpendicular to the axial line, and in the shaft body, a diameter of a portion in which the fiber pull-in section is formed is smaller than a diameter of a portion in which the measuring section is formed and a diameter of a portion in which the fiber kneading section is formed.

An injection device of the invention includes the plasticizing device; a discharging section connected to a distal end of the barrel; and an injecting section coupled with the discharging section and configured to inject a resin supplied through the discharging section and molten and kneaded in the plasticizing device.

A molding apparatus of the invention Includes the injection device; and a mold device configured to clamp a mold into which the resin is injected by the injection device.

A manufacturing method of molded parts of the invention includes supplying a resin material, into a barrel that receives a screw, from a resin material supply port portion formed in a peripheral wall portion of the barrel; and supplying a continuous fiber into the barrel from a fiber supply port portion formed on a distal side of the barrel from the resin material supply port portion in the peripheral wall portion of the barrel and having an opening that communicates with the inside of the barrel, wherein a maximum length of the barrel along an axial direction thereof is 1 time or more and 2 times or less as much as a pitch of a flight disposed in a portion of the screw which faces the opening of the fiber supply port portion in a direction perpendicular to an axial line of the barrel.

According to the present invention, there are provided a plasticizing device, an injection device, a molding apparatus and a manufacturing method of molded parts in which it is possible to prevent generation of variation of an amount of a reinforcing fiber to be pulled into an inner hole of a barrel, and hence it is possible to manufacture the molded parts which are uniform in physical properties such as strength and rigidity.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 4 is a cross-sectional view showing a state where the barrel and a screw are cut along a cross section perpendicular to the axial line;

FIG. 5 is a cross-sectional view showing a state where the barrel is cut along the cross section perpendicular to the axial line;

FIG. 10 is a cross-sectional view showing the barrel and the screw in a partially cut state;

FIG. 11 is a plan view showing a modification of the barrel;

FIG. 12 is a plan view showing a modification of the barrel;

FIG. 13 is a plan view showing a modification of the barrel;

FIG. 14 is a plan view showing a modification of the barrel;

FIG. 15 is a plan view showing a modification of the barrel;

DETAILED DESCRIPTION OF THE INVENTION

Figure 1:
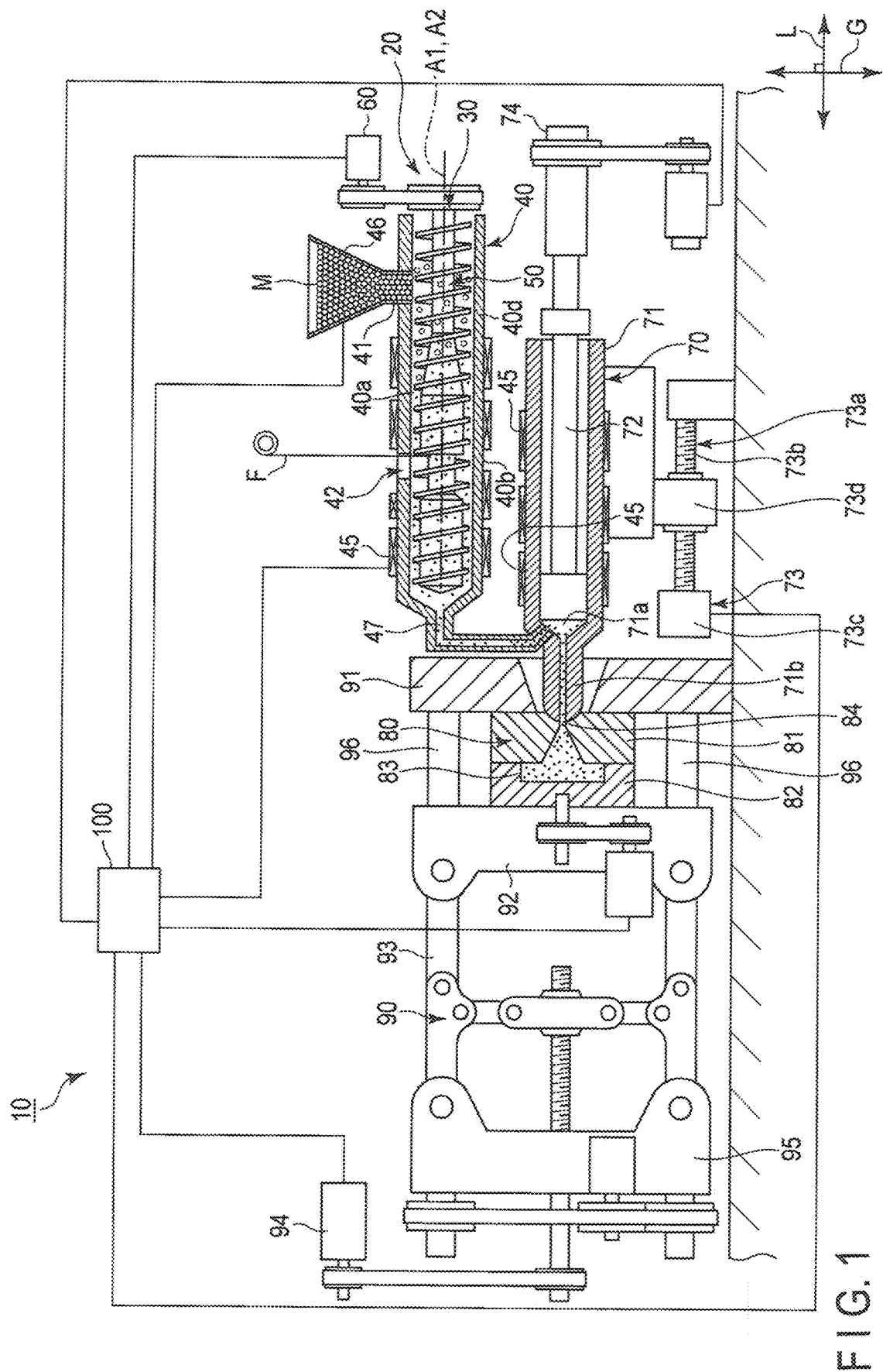
FIG. 1 is a side view showing a molding apparatus according to one embodiment of the present invention in a partially cut state.

A molding apparatus 10 according to one embodiment of the present invention is described with reference to FIGS. 1 to 19. FIG. 1 is a side view showing the molding apparatus 10 in a partially cut state. As shown in FIG. 1, the molding apparatus 10 is, for example, a preliminarily plasticizing type injection molding apparatus.

The molding apparatus 10 has, for example, an injection device 20, a mold set 80 that receives a molten resin injected by the injection device 20, a clamping device 90 that clamps the mold set 80, and a controller 100.

Here, an upward-downward direction G and a forward-backward direction L are set to the molding apparatus 10. A direction in which gravity acts is defined as a downward direction, thereby setting the upward-downward direction G. A direction of the injection device 20 toward the mold set 80 is defined as a forward direction, thereby setting the forward-backward direction L.

The injection device 20 has a plasticizing device 30 as a plasticizing section which melts a resin material M to form a molten resin and kneads this molten resin with a fiber F, and an injecting section 70 which measures and injects the molten resin. The fiber F is one example of a reinforcing fiber.

The plasticizing device 30 is configured to melt and plasticize the resin material M and to knead the molten resin with the fiber F that is the reinforcing fiber. The plasticizing device 30 has a barrel 40, a discharging section 47 connected to a distal end of the barrel 40, a hopper section 46, a heater 45 that is capable of heating the barrel 40, the fiber F, a screw 50 received in the barrel 40, and a screw driving section 60 which rotates and drives the screw 50.

The barrel 40 is, for example, a hollow cylindrical body in which an inner space forming an inner hole 40a is surrounded with a peripheral wall portion 40d, and the barrel is formed so that the screw 50 can be received in the barrel.

The barrel 40 is coupled with the injecting section 70 with a posture that the distal end of the barrel in a longitudinal direction is directed on a mold set 80 side, a proximal end thereof is directed on a screw driving section 60 side opposite to the mold set 80, and an axial line A1 extending in the longitudinal direction is perpendicular to the upward-downward direction G, i.e., the posture that the axial line A1 is parallel to a horizontal direction.

In the barrel 40, a resin material supply port portion 41 is formed in the peripheral wall portion 40d on a proximal side. Furthermore, in the barrel 40, a fiber supply port portion 42 is formed in the peripheral wall portion 40d that is a portion between the distal end and the resin material supply port portion 41.

The resin material supply port portion 41 is formed in an upper portion of the peripheral wall portion 40d of the barrel 40, and passes through the peripheral wall portion in a direction perpendicular to the axial line A1. Via the resin material supply port portion 41, the inside of the barrel 40 communicates with the outside thereof. In the resin material supply port portion 41, the hopper section 46 to store the resin material M is provided.

Examples of the resin material M include various types of thermoplastic resins such as a polyethylene-based resin, a polypropylene-based resin, an acrylic resin and an ABS resin. Furthermore, in one example, the resin material M is formed in pellets. In another example, the resin material M may be constituted of a resin material of a continuous shape cut into lengths each of which is equal to a length of each pellet by use of a cutting device.

Figure 2:
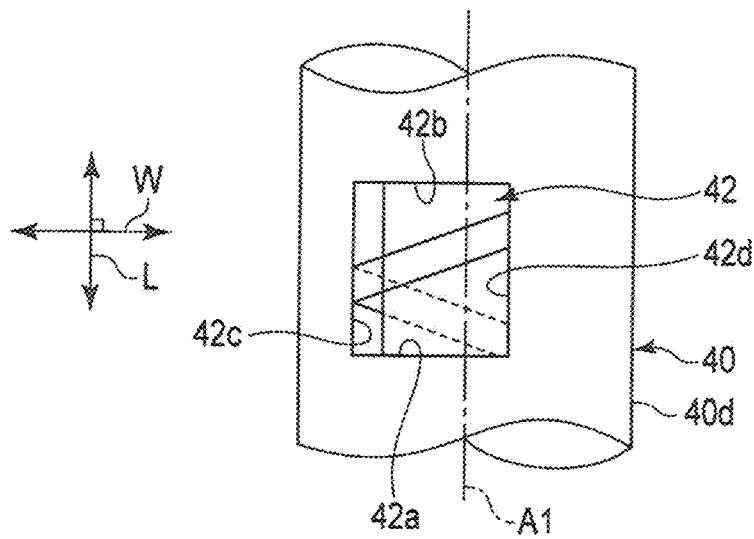
FIG. 2 is a plan view showing a state where the vicinity of a fiber supply port portion of a barrel of the molding apparatus is seen along an upward-downward direction.
Figure 3:
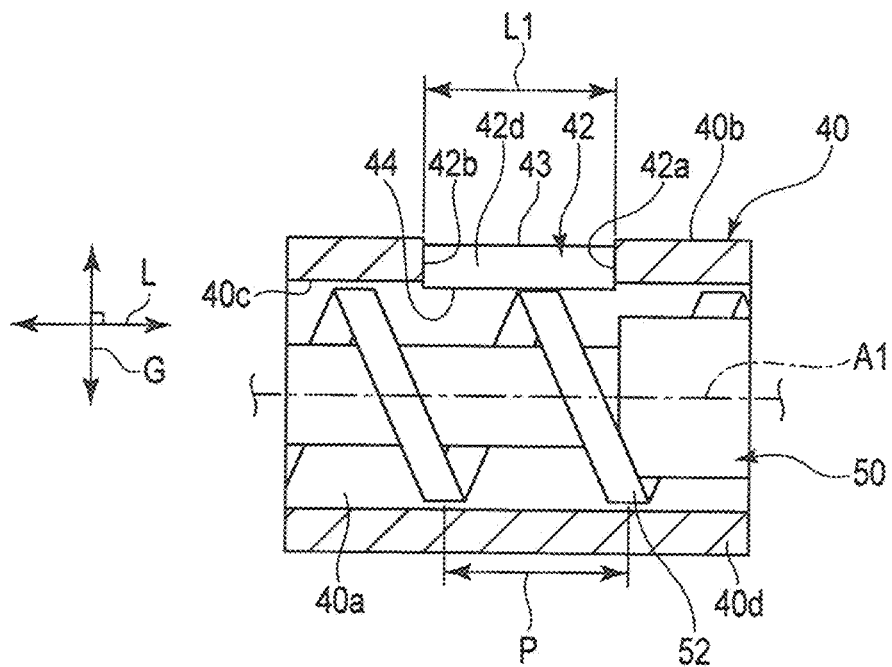
FIG. 3 is a cross-sectional view showing a state where the barrel is cut along a cross section passing an axial line of the barrel.

FIG. 2 is a plan view showing a state where the vicinity of the fiber supply port portion 42 of the barrel 40 is seen along the upward-downward direction G. In other words, FIG. 2 is a plan view showing a state where the vicinity of the fiber supply port portion 42 of the barrel 40 is seen along the direction perpendicular to the axial line A1. Here, a width direction W is set. The direction perpendicular to the axial line A1 when seeing the fiber supply port portion 42 along the upward-downward direction G is defined as the width direction W. FIG. 3 is a cross-sectional view showing a state where the barrel 40 is cut along a cross section passing the axial line A1.

As shown in FIGS. 2 and 3, the fiber supply port portion 42 is formed in the upper portion of the peripheral wall portion 40d of the barrel 40, and passes through the peripheral wall portion of the barrel 40 in the direction perpendicular to the axial line A1, i.e., the upward-downward direction G. The fiber supply port portion 42 has a cross section of a constant shape in its pass-through direction, i.e., the direction perpendicular to the axial line A1.

That is, a sectional shape of the fiber supply port portion 42 which is perpendicular to the upward-downward direction G from a first opening 43 that opens in an outer peripheral surface 40b of the barrel 40 to a second opening 44 that opens in the inner hole 40a of the barrel 40 is formed to be constant in the upward-downward direction G (the direction perpendicular to the axial line A1). The first opening 43 indicates a portion that intersects the outer peripheral surface 40b of the barrel 40. The second opening 44 indicates a portion that intersects an inner peripheral surface 40c of the barrel 40.

More specifically, planar shapes of the openings 43 and 44 when seen along the upward-downward direction G are the same shape and have the same size. Furthermore, a center of the first opening 43 and a center of the second opening 44 are arranged in the direction perpendicular to the axial line A1.

Description will further specifically be made as to the fiber supply port portion 42. The fiber supply port portion 42 has, as its inner peripheral surfaces, a first inner surface 42a, a second inner surface 42b, a third inner surface 42c, and a fourth inner surface 42d.

The first inner surface 42a is disposed on the proximal side of the barrel 40 in an axial direction thereof and is formed in a plane perpendicular to the axial line A1. The second inner surface 42b is disposed on a distal side of the barrel 40 in the axial direction thereof and is formed in the plane perpendicular to the axial direction.

The third inner surface 42c is formed in a plane that is parallel to the pass-through direction of the fiber supply port portion 42 and the axial line A1. The fourth inner surface 42d is formed in a plane that faces the third inner surface 42c and is parallel to the third inner surface 42c.

The first opening 43 is constituted of edges of the inner surfaces 42a, 42b, 42c and 42d on an outer peripheral surface side. The second opening 44 is constituted of edges of the inner surfaces 42a, 42b, 42c and 42d on an inner hole 40a side of the barrel 40.

A maximum length L1 of the fiber supply port portion 42 along the axial line A1 of the second opening 44 is set to a length of 1 time or more and 2 times or less as much as a pitch P of a flight 52 disposed in a fiber pull-in section 54 of the screw 50 which will be described later. That is, L1 has a relation of $P \leq L1 \leq 2 \cdot P$. The fiber pull-in section 54 is an example of a portion of the screw 50 which faces the second opening 44 in the direction perpendicular to the axial line A1.

It is to be noted that in the present embodiment, the maximum length L1 of the fiber supply port portion 42 along the axial line A1 of the second opening 44 is a length of the inner surface 42c or 42d along the axial line A1. Furthermore, a length of the first opening 43 along the axial line A1 is also L1.

FIG. 4 is a cross-sectional view in which a state where the barrel 40 and the screw 50 are cut along the cross section perpendicular to the axial line A1 is seen from a screw driving section 60 side of the proximal side toward the distal side. As shown in FIG. 4, an arrow indicates a rotating direction RD of the screw 50. In the screw 50, as described later, an axial line A2 of the screw 50 is disposed coaxially with the axial line A1 of the barrel 40.

Here, in the barrel 40, a first range R1 and a second range R2 are set on the basis of the rotating direction of the screw 50. The first range R1 is defined as a range where the screw 50 rotates downward. The second range R2 is defined as a range where the screw 50 rotates upward.

At least one of edges of the second opening 44 along the axial line A1 is disposed in the first range R1. In other words, according to the present embodiment, an edge 42e of the third inner surface 42c that forms a part of the second opening 44 on the inner hole 40a side of the barrel 40 is disposed in the first range R1. That is, the third inner surface 42c is disposed in the first range R1.

Furthermore, a position of the edge 42e disposed in the first range R1 among the edges of the second opening 44 along the axial line A1 is set as follows. FIG. 5 is a view to explain the position of the edge 42e disposed in the first range R1 among the edges of the second opening 44 along the axial line A1. FIG. 5 is a cross-sectional view in which a state of the barrel 40 cut along the cross section perpendicular to the axial line A1 is seen from the proximal side toward the distal side.

As shown in FIG. 5, when an inner diameter of the inner hole 40a of the barrel 40 is R, the edge 42e disposed in the first range R1 among the edges of the second opening 44 along the axial line A1 is disposed at one of positions between a first position P1 and a second position P2 which contain these positions P1 and P2 in the width direction W from the axial line A1. In other words, the edge 42e is disposed at the first position P1, the second position P2, or the position between the first position P1 and the second position P2.

The first position P1 is a position distant as much as a distance $(R \cdot \sqrt{3}/2)$ from the axial line A1 in the width direction W. The second position P2 is a position distant as much as the distance R from the axial line A1 in the width direction. That is, the first position P1 is a position of 60 degrees from an upper end P4 of the barrel 40 in the rotating direction of the screw 50, and the second position P2 is a position of 90 degrees from the upper end P4 of the barrel 40 in the rotating direction of the screw 50.

In the present embodiment, as one example, one end of the second opening 44 in the width direction W is present at the first position P1 distant as much as the distance $(R \cdot \sqrt{3}/2)$ from the axial line A1 in a planar view seen along the upward-downward direction G.

In the second opening 44, another edge 42f along the axial line A1 is disposed in, for example, the second range R2 in the present embodiment. In other words, the fourth inner surface 42d of the fiber supply port portion 42 is disposed in the second range R2.

The discharging section 47 is connected to the distal end of the barrel 40. The discharging section 47 has a conical portion that is continuous with the distal end of the barrel 40 and has a decreasing diameter, and a bending tube portion that is continuous with this conical portion and bends downward. The discharging section 47 is formed so that the above-mentioned molten resin including the fiber F can flow through an inner portion of the discharging section.

As shown in FIG. 1, the heater 45 is provided in the outer peripheral surface 40b of the barrel 40. For example, current is supplied to the heater 45 to heat.

The fiber F wound around, for example, a bobbin or the like is disposed above the fiber supply port portion 42.

Figure 6:
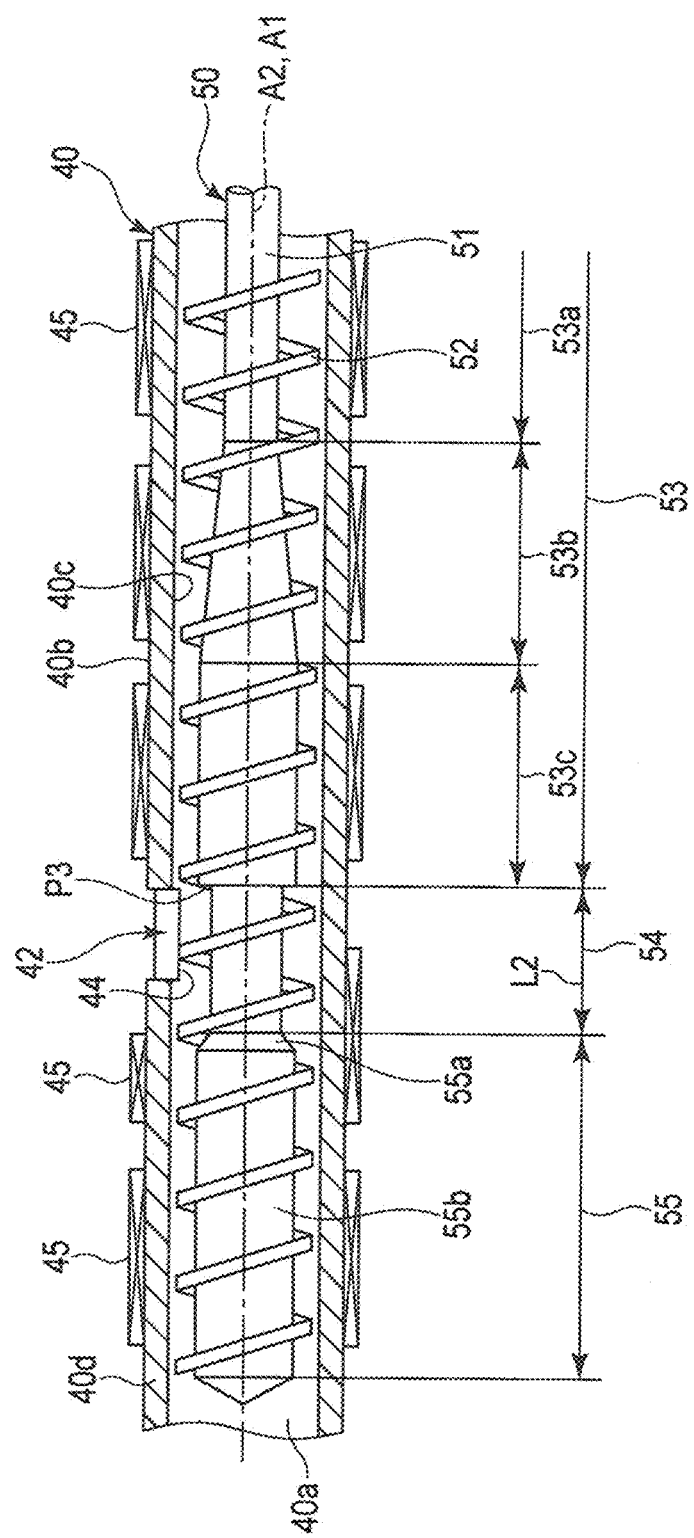
FIG. 6 is a side view showing the barrel and the screw in a partially cut state.

The screw 50 is rotatably received in the barrel 40. FIG. 6 is a side view showing the barrel 40 and the screw 50 in a partially cut state. As shown in FIG. 6, the screw 50 has a shaft body 51 and the flight 52 formed spirally around the outer peripheral surface of the shaft body 51. In the screw 50, the axial line A2 of the shaft body 51 is disposed coaxially with the axial line A1 of the barrel 40.

Furthermore, the screw 50 has a resin material melting section 53, the fiber pull-in section 54, and a fiber kneading section 55. The resin material melting section 53, the fiber pull-in section 54 and the fiber kneading section 55 are formed in order from a proximal end of the screw 50 which is coupled with the screw driving section 60 toward a distal end thereof.

The resin material melting section 53 has a supplying section 53a, a compressing section 53b, and a measuring section 53c. The supplying section 53a, the compressing section 53b and the measuring section 53c are formed in order from the proximal end of the screw 50 toward the distal end thereof.

The shaft body 51 of the supplying section 53a is formed into a columnar shape. The shaft body 51 of the compressing section 53b is formed into a conical shape whose diameter increases toward the distal side. The conical shape of the shaft body 51 of the compressing section 53b is contrived and formed to decrease a clearance between the shaft body 51 and the inner peripheral surface 40c of the barrel 40 with decrease of a volume due to melting of the resin material M.

The shaft body 51 of the measuring section 53c is formed into a columnar shape whose diameter is larger than a diameter of the shaft body 51 of the supplying section 53a. The shaft body 51 of the measuring section 53c is formed into a columnar shape whose diameter is the same as that of one end of the shaft body 51 of the compressing section 53b.

The fiber pull-in section 54 is formed at a position of the screw 50 which faces the fiber supply port portion 42 in a direction perpendicular to the axial line A2. The shaft body 51 of the fiber pull-in section 54 is formed into a columnar shape whose diameter is smaller than that of the measuring section 53c.

A boundary portion P3 between the fiber pull-in section 54 and the measuring section 53c may be disposed on the proximal side of the barrel 40 including a position that faces a proximal side edge of the second opening 44, i.e., an edge of the first inner surface 42a on an inner peripheral surface side of the barrel 40, in the direction perpendicular to the axial line A2. In the present embodiment, as one example, the boundary portion P3 faces the edge of the second opening 44 on the inner peripheral surface side of the first inner surface 42a in the direction perpendicular to the axial line A2.

The fiber pull-in section 54 has a length to sufficiently achieve winding of the fiber F into the molten resin. Here, a length L2 of the fiber pull-in section 54 along the axial line A2 is described. A distal end F1 of the fiber F starts to be wound into the molten resin in a range of 90 degrees to 180 degrees from a base point of the upper end P4 in the rotating direction of the screw 50. Consequently, the winding of the fiber F into the molten resin is started in a portion of the fiber pull-in section 54 on a distal side of the second opening 44 in the direction perpendicular to the axial line A2.

When the screw 50 rotates at least once after the winding of the fiber F into the molten resin is started, the winding of the fiber F into the molten resin is sufficiently achieved. That is, when the fiber pull-in section 54 further has a length of one pitch P of the flight 52 from the position at which the winding of the fiber F into the molten resin is started, the winding of the fiber F into the molten resin is sufficiently achieved.

Consequently, the length L2 of the fiber pull-in section 54 along the axial line A2 is L2=(a shift length L3 of an edge of the second opening 44 on a proximal side of the axial line A1 into the fiber pull-in section 54)+(the maximum length L1 of the second opening 44 along the axial line A1)+(the length P of one pitch of the flight 52).

The shift length L3 of the edge of the second opening 44 on the proximal side of the axial line A1 into the fiber pull-in section 54 is the length along which the edge of the second opening 44 on the proximal side of the axial line A1 shifts into the fiber pull-in section 54 when seen in the direction perpendicular to the axial line A2 as described above. In the present embodiment, the boundary portion P3 faces the inner peripheral surface side edge of the barrel 40 of the first inner surface 42a of the second opening 44 in the direction perpendicular to the axial line A2. Consequently, the shift length L3 is L3=0. In other words, when the inside of the barrel 40 is seen through the second opening 44, the measuring section 53c does not shift into the second opening 44.

Consequently, in the present embodiment, the length L2 of the fiber pull-in section 54 along the axial line A2 is L2=(L1+P).

The fiber kneading section 55 has a conical portion 55a and a main body portion 55b. The shaft body 51 of the conical portion 55a is formed continuously with the shaft body 51 of the fiber pull-in section 54. The shaft body 51 of the conical portion 55a is formed into a conical shape whose diameter increases toward a distal end of the screw 50.

The shaft body 51 of the main body portion 55b is formed continuously with the shaft body 51 of the conical portion 55a. The shaft body 51 of the main body portion 55b is formed so that its diameter is larger than a diameter of the shaft body 51 of the fiber pull-in section 54. In the present embodiment, as one example, the shaft body 51 of the main body portion 55b is formed so that its diameter is the same as a diameter of the shaft body 51 of the measuring section 53c.

As described above, the flight 52 is formed spirally around the outer peripheral surface of the shaft body 51. At least a portion of the flight 52 which is disposed in the fiber pull-in section 54 is formed at an equal pitch. In the present embodiment, as one example, the flight 52 is formed as a whole spirally around the outer peripheral surface of the shaft body 51 at the pitch P. A diameter of the flight 52 is constant in one example. The flight 52 has a small clearance between the flight and the inner peripheral surface of the barrel 40 so that the flight does not come in contact with the inner peripheral surface during the rotation.

As shown in FIG. 1, the proximal end of the screw 50 is fixed to the screw driving section 60. The screw driving section 60 is constituted so that the screw 50 is rotatable around the axial line A2 of the screw 50. The screw driving section 60 has, for example, an electric motor and rotates the screw 50 by rotation of the electric motor.

The injecting section 70 is constituted so that the molten resin plasticized in the plasticizing device 30 and including the fiber F therein can be injected. The injecting section 70 has an injection cylinder 71, an injection plunger 72 received in the injection cylinder 71, an advancing/retreating driving section 73 that advances and retreats the injecting section 70 relative to the mold set 80 in the forward-backward direction L, a plunger driving section 74 that operates the injection plunger 72 forward and backward, and the heater 45.

The injection cylinder 71 is formed into, for example, a cylindrical shape and has a receiving space 71a therein. A distal portion of the injection cylinder 71 is coupled with the discharging section 47 of the barrel 40. The receiving space 71a communicates with the discharging section 47.

Furthermore, a discharging section 71b is formed in the distal portion of the injection cylinder 71. The discharging section 71b is formed into a nozzle shape. The discharging section 71b is formed so that the molten resin including the fiber F can flow therethrough.

The injection plunger 72 is received in the receiving space 71a. The injection plunger 72 is formed to be movable in the receiving space 71a along an axial line of the injection cylinder 71. Furthermore, the injection plunger 72 is constituted so that the molten resin including the fiber F can be pushed outside.

The advancing/retreating driving section 73 is fixed to, for example, the injection cylinder 71 and constituted so that the injection cylinder 71 is movable in the forward-backward direction L along directions approaching and leaving the mold set 80. The advancing/retreating driving section 73 has, for example, a ball screw device 73a, and a driving section 73c which rotates a screw portion 73b of the ball screw device 73a. A nut portion 73d of the ball screw device 73a is fixed to the injection cylinder 71.

When the screw portion 73b is rotated by the driving section 73c, the injecting section 70 is moved in the forward-backward direction L.

The heater 45 is disposed on an outer peripheral surface of the injection cylinder 71.

The mold set 80 has a fixed mold 81 and a movable mold 82. The fixed mold 81 and the movable mold 82 are combined to form a cavity 83 in which a molded part is formed. In the fixed mold 81, a through hole 84 is formed through which the molten resin injected from the discharging section 71b of the injection cylinder 71 passes.

The clamping device 90 has a fixed platen 91, a movable platen 92, a toggle mechanism 93 whose one end is coupled with the movable platen 92, a link housing 95 coupled with the other end of the toggle mechanism 93, a tie bar 96 whose one end is attached to the fixed platen 91 whereas the other end thereof is attached to the link housing 95, and a clamping driving section 94 that drives the toggle mechanism 93 provided in the link housing 95 to clamp the mold.

The fixed mold 81 is fixed to the fixed platen 91. The movable mold 82 is fixed to the movable platen 92. The toggle mechanism 93 is constituted so that the movable platen 92 is movable to open and close the mold set 80, i.e., to open and close the movable mold 82 relative to the fixed mold 81.

The controller 100 is constituted so that, for example, the heater 45, the hopper section 46, the screw driving section 60, the driving section 73c, the plunger driving section 74 and the clamping driving section 94 can be controlled.

Specifically, the controller 100 is constituted to heat the heater 45 so that a temperature of the barrel 40 can be controlled. Furthermore, the controller 100 is constituted to control the hopper section 46 so that an amount of the resin material M to be supplied can be controlled.

Furthermore, the controller 100 is constituted to control the screw driving section 60 so that the rotation of the screw 50 can be controlled. Furthermore, the controller 100 is constituted to control the driving section 73c so that an advancing/retreating operation of the injecting section 70 can be controlled. Furthermore, the controller 100 is constituted to control the plunger driving section 74 so that the advancing/retreating operation of the injection plunger 72 in the injection cylinder 71 can be controlled.

Next, there will be described the flight 52 of the screw 50 which can be seen through the second opening 44 of the fiber supply port portion 42. It is to be noted that here, when it is described that the flight can be seen, it is indicated that the flight can be seen in a state where the resin material M is not supplied into the barrel 40.

Figure 7:
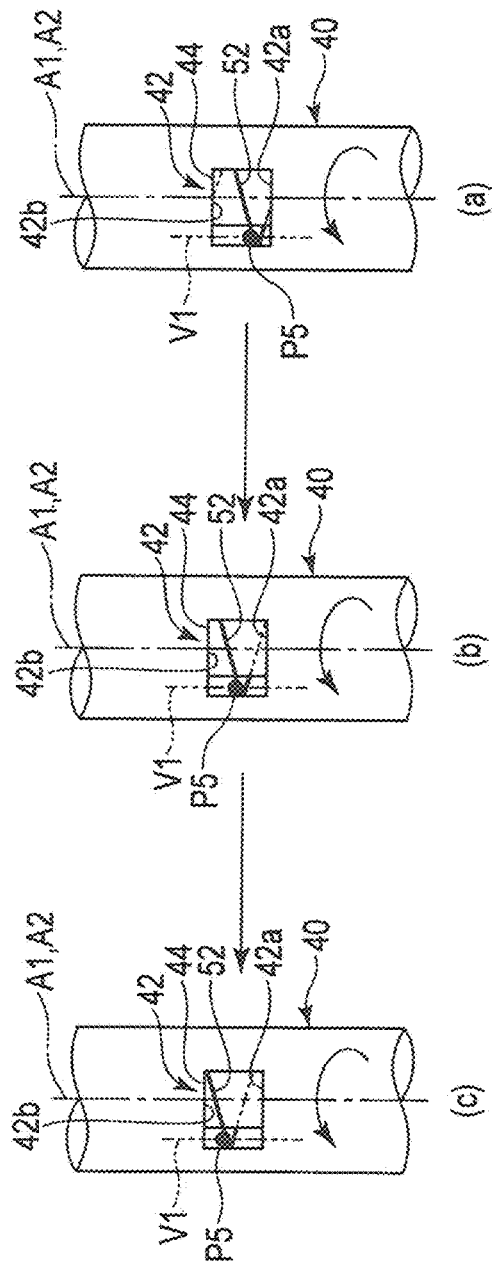
FIG. 7 is a plan view showing a state where the fiber supply port portion is seen along the upward-downward direction.
Figure 7:
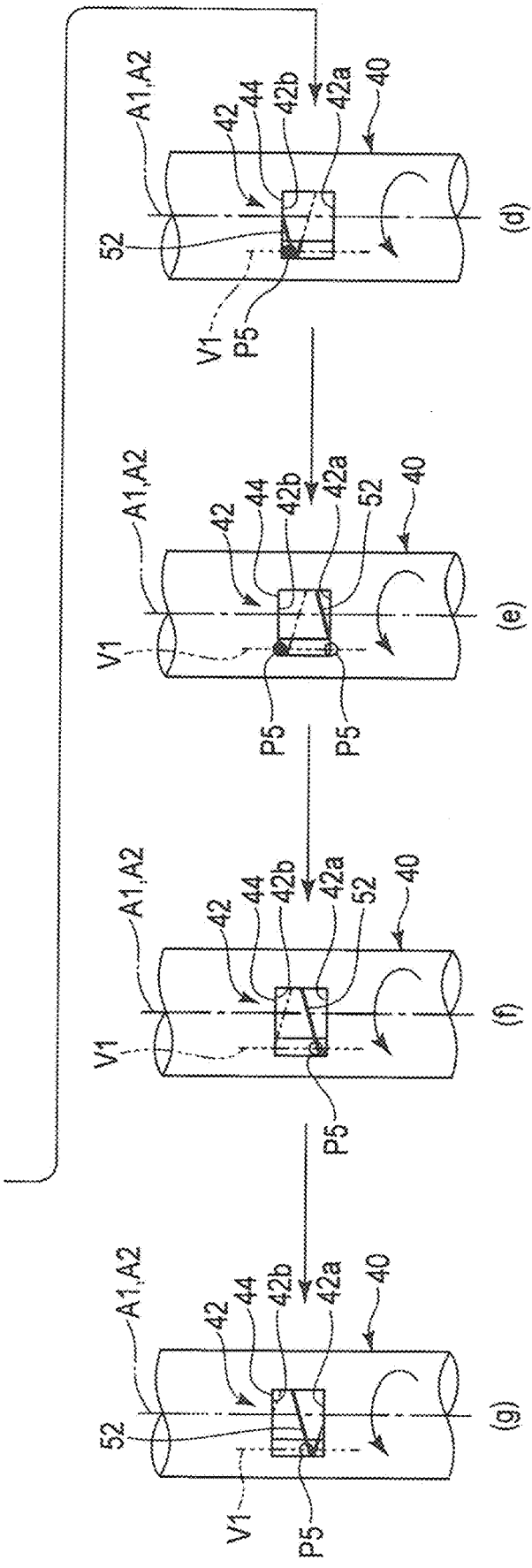

FIG. 7 is a plan view showing a state where the fiber supply port portion 42 is seen along the upward-downward direction G. FIG. 7 shows behaviors in which by the rotation of the screw 50, the flight 52 moving in the fiber supply port portion 42 apparently moves to the distal side of the barrel 40, in order of (a), (b), (c), (d), (e), (f), and (g).

Here, for the description, a virtual line V1 parallel to the axial line A1 is set. The virtual line V1 is disposed at an optional position in the fiber supply port portion 42. In the planar view shown in FIG. 7, an intersection point between the virtual line V1 and the flight 52 is defined as an intersection point P5.

When the screw 50 rotates, the intersection point P5 advances from the proximal side of the barrel 40 as shown in FIG. 7(a) apparently toward the distal end of the barrel 40 as shown in FIG. 7(d).

Furthermore, as shown in FIG. 7(e), when the flight 52 apparently advances to the distal side, the intersection point P5 moves to the edge of the second opening 44 on the distal side, i.e., the distal side from the second inner surface 42b of the fiber supply port portion 42, so that the intersection point P5 cannot be seen through the second opening 44.

However, when the length L1 of the fiber supply port portion 42 along the axial line A1 has a relation of $P \leq L1 \leq 2P$, a portion of the flight 52 on the proximal side of the barrel 40 on the virtual line V1 appears through the second opening 44, and hence the intersection point P5 between the portion on the proximal side of the barrel 40 and the virtual line V1 newly appears. That is, the intersection point P5 can always be seen through the second opening 44.

When the screw 50 further rotates, the intersection point P5 that newly appears apparently advances to the distal side of the barrel 40 as shown in FIG. 7(f). Thus, the maximum length L1 of the fiber supply port portion 42 along the axial line A1 of the barrel 40 has the relation of $P \leq L1 \leq 2 \cdot P$, so that the intersection point P5 can always be seen through the second opening 44.

It is to be noted that the position of the virtual line V1 shown in FIG. 7 is one example. Even when the virtual line V1 is set to any position of the second opening 44 in the width direction W, the intersection point P5 can always be seen through the second opening 44.

Hereinafter, one example of an operation of the molding apparatus 10 will be described. The controller 100 drives the heater 45 to heat the barrel 40. The temperature of the barrel 40 is detected by a temperature sensor or the like and sent to the controller 100.

After the temperature of the barrel 40 rises up to a predetermined value, the controller 100 operates the hopper section 46 to supply the resin material M in the form of the pellets into the barrel 40 through the resin material supply port portion 41.

Furthermore, the controller 100 controls the screw driving section 60 to rotate and drive the screw 50. When the screw 50 rotates, the resin material M moves from the supplying section 53a of the screw 50 to the compressing section 53b. Furthermore, the resin material M is heated by the heater 45, molten by the compressing section 53b to form the molten resin, and sent to the measuring section 53c.

The molten resin is transferred toward the discharging section 47 through a spiral space defined by the inner peripheral surface of the barrel 40 and the flight 52, in accordance with the rotation of the screw 50.

Next, at a timing when the molten resin reaches the fiber pull-in section 54, the fiber F is supplied. A supplying method of the reinforcing fiber may automatically be performed by, for example, the controller 100. As this one example, the fiber F may be dropped to the fiber supply port portion 42 by rotating the bobbin or the like around which the fiber F is wound, under the control of the controller 100. Alternatively, an operator may drop the reinforcing fiber to the fiber supply port portion 42.

Figure 8:
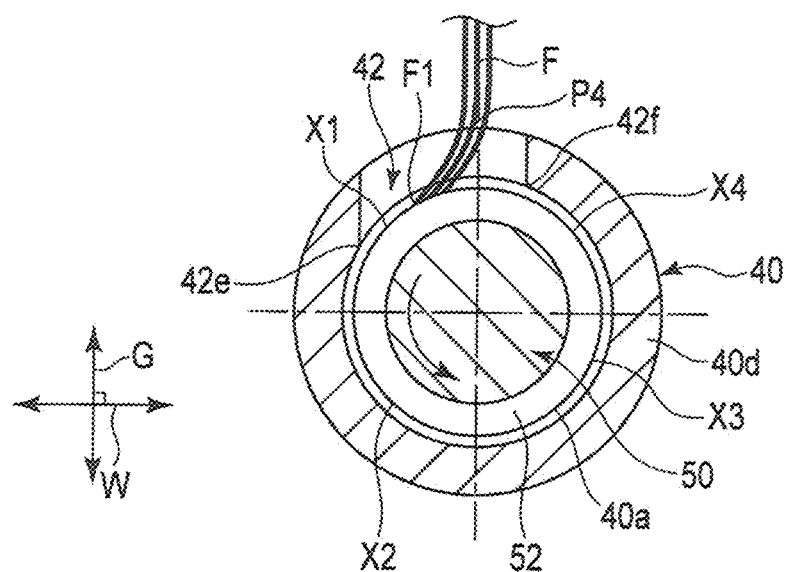
FIG. 8 is a cross-sectional view showing a state where the barrel and the screw are cut along the cross section perpendicular to the axial line.

FIG. 8 is a cross-sectional view showing that a state where the barrel 40 and the screw 50 are cut along the cross section perpendicular to the axial line A1 is seen from the proximal side toward the distal side. FIG. 8 shows a state where the distal end F1 of the fiber F is supplied through the fiber supply port portion 42 into the barrel 40. As shown in FIG. 8, it is preferable that the distal end F1 of the fiber F is dropped to the upper end P4 of the screw 50 or the vicinity of the upper end P4. In other words, the fiber F wound around the bobbin or the like is disposed at a position at which, when the fiber F is dropped, the distal end F1 of the fiber is dropped to the upper end P4 of the screw 50 or the vicinity of the upper end P4.

When the distal end F1 of the fiber F is dropped to the upper end P4 or the vicinity of the upper end P4 and comes in contact with the surface of the molten resin between the flights 52 adjacent to each other in an axial line A2 direction, the fiber F enters into the molten resin. Further, the distal end F1 is wound into the flow of the molten resin that flows spirally along the rotation of the screw 50, whereby the fiber F40 is pulled into the barrel 40 through the fiber supply port portion 42.

Figure 9:
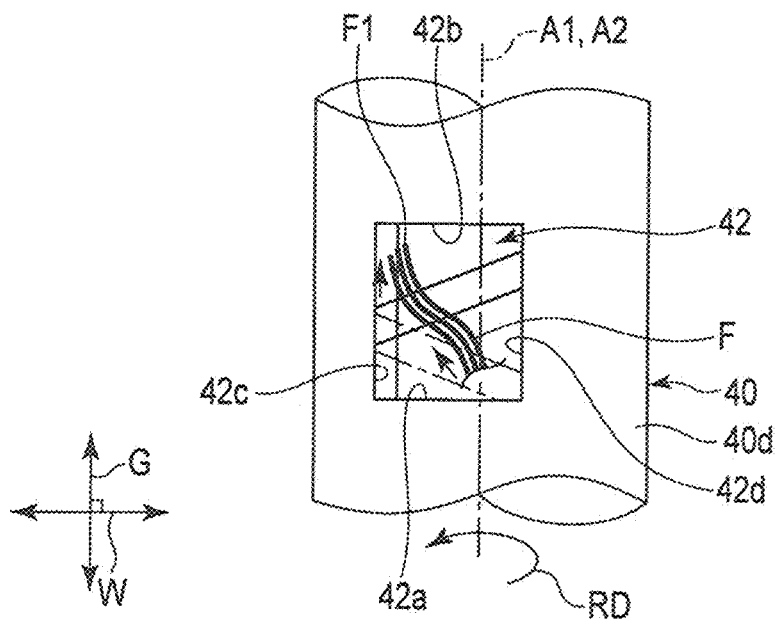
FIG. 9 is a plan view showing a state where the fiber supply port portion is seen along the upward-downward direction.

FIG. 9 is a plan view showing a state where the fiber supply port portion 42 is seen along the upward-downward direction G. FIG. 9 shows a state where the distal end F1 of the fiber F is wound into the molten resin to move with the transfer of the molten resin.

It is to be noted that a position of the distal end F1 of the fiber F wound into the molten resin advances through a first region X1, a second region X2, a third region X3, and a fourth region X4 in order with the rotation of the screw 50 as shown in FIG. 8.

The first region X1 is a range from the upper end P4 of the barrel 40 of the base point to 90 degrees in the rotating direction of the screw 50. That is, the first region X1 is a range of 0 degree or more and smaller than 90 degrees while the upper end P4 is defined as 0 degree.

The second region X2 is a range of 90 degrees or more and smaller than 180 degrees in the rotating direction of the screw 50 on the basis of the upper end P4 of the base point. The third region X3 is a range of 180 degrees or more and smaller than 270 degrees in the rotating direction of the screw 50 on the basis of the upper end P4 of the base point. The fourth region X4 is a range of 270 degrees or more and smaller than 0 degree in the rotating direction of the screw 50 on the basis of the upper end P4 of the base point.

FIG. 10 is a cross-sectional view showing the barrel 40 and the screw 50 in a partially cut state. FIG. 10 shows a state where the fiber F is pulled into the barrel 40. As shown in FIGS. 9 and 10, the distal end F1 of the fiber F and a portion thereof after the distal end fall on the molten resin and are supported by the flight 52 in the first region X1, thereby stabilizing a posture of the fiber on the molten resin.

Furthermore, when the length L1 of the second opening 44 along the axial line A1 of the barrel 40 has the relation of $P \leq L1 \leq 2 \cdot P$, the flight 52 always appears on a line passing a point to which the fiber F is supplied in parallel with the axial line A1 as described above with reference to FIG. 7.

Consequently, even when the fiber F is pulled inside with the rotation of the screw 50, the fiber F always falls on the flight 52 to be supported by the flight 52 and takes a posture in the regions X1 and X2 as a fixed posture as shown in FIGS. 9 and 10.

When the posture of the fiber F in the regions X1 and X2 is always constant, an amount of the fiber F to be pulled into the barrel 40 per unit time with the rotation of the screw 50 always becomes constant.

The fiber F enters from the first region X1 into the second region X2, to be pulled toward a center in the width direction. That is, the fiber F advances to the second region and more, to be wound into the molten resin.

Furthermore, when the fiber F advances from the second region X2 to the third region X3, its wind-in direction changes from a downward wind-in direction to an upward wind-in direction. In this case, the fiber F is firmly hooked at an edge 52a of the flight 52 as shown in FIG. 10.

Consequently, the fiber F is prevented from slipping relative to the rotation of the screw 50, and hence the amount of the fiber F to be pulled into the barrel 40 per unit time further becomes stable.

When the fiber F pulled into the barrel 40 advances from the fiber pull-in section 54 to the fiber kneading section 55, the fiber is cut by the flight 52 and kneaded into the molten resin. Furthermore, an amount of the molten resin to be transferred is measured by the fiber kneading section 55.

The measured molten resin is sent into the injection cylinder 71 of the injecting section 70 through the discharging section 47.

When the molten resin kneaded with the fiber F is sent into the injection cylinder 71, the controller 100 drives the clamping driving section 94 to move the movable platen 92 via the toggle mechanism 93, thereby closing the mold set 80.

Next, the controller 100 drives the advancing/retreating driving section 73 to bring the injecting section 70 close to the mold set 80, and moves the injecting section 70 to a position at which the discharging section 51b communicates with the cavity 83 of the mold set 80.

Next, the controller 100 drives the plunger driving section 74 of the injecting section 70 at a predetermined timing to perform the advancing operation of the injection plunger 72, thereby injecting the molten resin of the injection cylinder 71 through the through hole 84 into the mold set 80.

After end of an injecting operation, the controller 100 drives the clamping driving section 64 to open the mold set 80 at a predetermined timing at which molding is completed.

Next, the controller 100 controls the advancing/retreating driving section 73, thereby retracting the injecting section 70 from the mold set 80.

As described above, an injection molding operation of one cycle is completed. In a case where injection molding is continuously carried out, the controller 100 performs, only once, each of an operation of driving the advancing/retreating driving section 73 to bring the injecting section 70 close to the mold set 80 and moving the injecting section 70 to a position at which the discharging section 51b communicates with the cavity 83 of the mold set 80, and an operation of driving the advancing/retreating driving section 73 to retract the injecting section 70 from the mold set 80 at the end of the continuous injection molding operation.

There are continuously repeatedly carried out the other operations including a clamping operation to the mold set 80, an injecting operation of the molten resin (an injection charging operation and a pressure keeping operation), a cooling operation (a molding solidifying operation), a mold opening operation to the mold set 80, a removing operation of the molded part, and a measuring operation of a material.

In the molding apparatus 10 having such a constitution, the maximum length L1 of the second opening 44 of the fiber supply port portion 42 along the axial line A1 of the barrel 40 is set to $L1=P \leq L1 \leq 2 \cdot P$. Consequently, the fiber F always falls on the flight 52 to be supported by the flight 52 and its posture in the regions X1 and X2 becomes a determined posture as shown in FIGS. 9 and 10. When the posture of the fiber F is always constant, the amount of the fiber F to be pulled into the barrel 40 per unit time with the rotation of the screw 50 always becomes constant.

Consequently, an amount of the fiber F to be included in the molten resin can be uniform, and hence it is possible to form the molded parts which are uniform in physical properties such as strength and rigidity.

Further, when $L1 \leq 2 \cdot P$ is set, it is possible to prevent the length of the barrel 40 along the axial line A1 from being redundant while obtaining the above-mentioned effect. Further, when $L1 \leq 2 \cdot P$ is set, it is possible to prevent the length of the second opening 44 itself from being redundant, and hence it is possible to prevent generation of disturbance when the fiber F is pulled into the barrel 40. For example, the disturbance means that the second opening 44 becomes large to lower a temperature of the molten resin, and hence physical properties of the molten resin change.

Furthermore, in the second opening 44 of the fiber supply port portion 42, one end in the width direction W is disposed at the first position P1 in the first range R1 that is a range where the screw 50 rotates downward, so that it is possible to prevent the fiber F from coming in contact with an edge of the one end of the second opening 44 in the width direction W.

Specifically, when the screw 50 rotates, the fiber F moves outside in the width direction W. At this time, there is the fear that the fiber F comes in contact with the edge of the one end of the second opening 44 in the width direction.

However, the one end of the second opening 44 in the width direction is located at the first position P1, thereby preventing the fiber F from coming in contact with the edge of the second opening 44 even when the fiber moves outside in the width direction W.

Similarly, even when the edge of the one end of the second opening 44 in the width direction is interposed between the first position P1 and the second position P2 or is located at the second position P2, it is possible to prevent the fiber F from coming in contact with the edge of the one end of the second opening 44 in the width direction W.

Furthermore, the diameter of the shaft body 51 of the fiber pull-in section 54 of the screw 50 is smaller than the diameter of the shaft body 51 of the measuring section 53c and a diameter of the fiber kneading section 55. Consequently, it is possible to shorten a length of the fiber which is required to wind the fiber F into the molten resin around the screw 50. Consequently, a ratio of a wind-in amount relative to a rotation amount of the screw 50 can be increased, and hence the fiber F can efficiently be wound into the molten resin.

Furthermore, the diameter of the shaft body 51 of the fiber pull-in section 54 of the screw 50 is smaller than the diameter of the shaft body 51 of the measuring section 53c and the diameter of the fiber kneading section 55, and consequently, in the fiber pull-in section 54, a height of the flight 52 relative to the molten resin is higher than another region of the screw 50.

The fiber F enters into a stepped portion formed between the edge 52a of the flight 52 and the molten resin, when the rotation of the screw 50 changes from the downward rotation to the upward rotation, i.e., when the fiber enters from the third region R3 into the fourth region R4.

As described above, when the height of the flight 52 relative to the molten resin increases in the fiber pull-in section 54, the stepped portion provided between the edge 52a of the flight 52 and the molten resin becomes large, and hence a holding force of the fiber F in this stepped portion can increase.

Furthermore, the measuring section 53c is not positioned in the second opening 44 when the second opening 44 is seen in the direction perpendicular to the axial line A2. Consequently, it is possible to prevent the fiber F from being supplied to the resin material melting section 53.

In the resin material melting section 53, the melting/kneading of the resin material M is performed, and hence viscosity of the resin material M is high. In a case where the fiber F is supplied to the resin material melting section 53, the viscosity of the resin material M is high, the fiber F receives a shearing force to be finely cut, and hence the fiber F might not maintain its predetermined length (dimension).

In this case, the dimension of the fiber F becomes excessively small and a function of a reinforcing material might not sufficiently be exerted. As described above, in the molding apparatus 10, the fiber F does not enter into the resin material melting section 53, the fiber F therefore is not cut more finely than necessary, it is possible to keep the fiber F with the predetermined length, and hence the fiber F can sufficiently exert the function of the reinforcing material.

It is to be noted that the present invention is not limited to the above embodiment and various modifications can be performed without departing from the gist of the present invention. Furthermore, a specific constitution of each portion, a specific control procedure in each step and the like are not limited to those illustrated in the above embodiment and can suitably be changed. Furthermore, even when parts of constitutional requirements of the above embodiment are omitted, it is possible to achieve the present invention.

A shape of the resin material M supplied from the resin material supply port portion 41 is not limited to the pellet shape. The shape of the resin material M may be another shape such as a powder shape, a grain shape, or a chip shape.

Furthermore, the fiber F is not limited to a carbon fiber or a glass fiber. The fiber F may be constituted of another material such as an aramid fiber, a boron fiber, or a polyethylene fiber.

Furthermore, in the present embodiment, as one example, one end of the second opening 44 of the fiber supply port portion 42 in the width direction W is located at the first position P1, i.e., the position distant as much as the distance $(R \cdot \sqrt{3}/2)$ from the axial line A1 in the planar view of the barrel 40 seen along the upward-downward direction G.

In a modification, as shown in FIG. 11, the edge 42e of one end of the second opening 44 in the width direction W may be located at the second position P2, i.e., a position distant as much as the distance R from the axial line A1 in the planar view seen along the upward-downward direction G. Alternatively, as shown in FIG. 12, the edge 42e of one end of the second opening 44 in the width direction w may be located at a position between the first position P1 and the second position P2 in the planar view seen along the upward-downward direction G.

Furthermore, in the present embodiment, the edge 42f of the other end of the second opening 44 of the fiber supply port portion 42 in the width direction W is located in the first range R1. In another example, the edge 42f of the other end of the second opening 44 in the width direction W may be located in the second range R2 as shown in FIG. 13. Furthermore, as shown in FIG. 14, the other end of the second opening 44 in the width direction W may be located between a position distant as much as the distance $(R \cdot \sqrt{3}/2)$ from the axial line A1 and a position distant as much as the distance R from the axial line A1, including these two positions, in the planar view seen along the upward-downward direction G.

Figure 16:
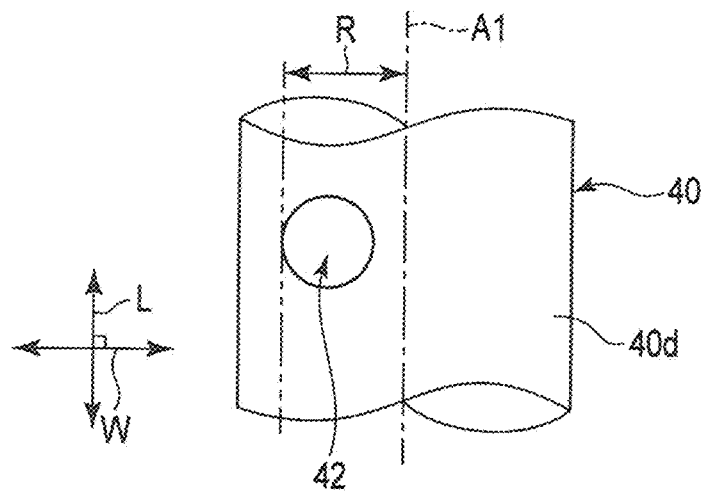
FIG. 16 is a plan view showing a modification of the barrel.

Furthermore, in the present embodiment, the fiber supply port portion 42 has a shape in which the first opening 43 and the second opening 44 are rectangular in a planar view seen in the direction perpendicular to the axial line A1. It is to be noted that the shape of the openings 43 and 44 is not limited to the rectangular shape. In another example, as shown in FIG. 15, the fiber supply port portion 42 may be formed into a shape in which the first opening 43 and the second opening 44 are trapezoidal in the planar view seen along the direction perpendicular to the axial line A1. Alternatively, as shown in FIG. 16, the fiber supply port portion 42 may be formed into, for example, a shape in which the first opening 43 and the second opening 44 are circular in the planar view seen along the direction perpendicular to the axial line A1.

In this way, also when the first opening 43 and the second opening 44 of the fiber supply port portion 42 have a shape other than the rectangular shape in the planar view seen in the direction perpendicular to the axial line A1 of the barrel 40, the maximum length L1 of the second opening 44 along the axial line A1 of the barrel 40 may only have the relation of $P \leq L1 \leq 2 \cdot P$, and one end of the second opening 44 in the width direction W which is disposed in the first range R1 where the rotating direction of the screw 50 becomes the downward direction may only be located between a position distant as much as the distance $(R \cdot \sqrt{3}/2)$ from the axial line A1 and a position distant as much as the distance R from the axial line A1, including these two positions, in the planar view seen along the upward-downward direction G.

Furthermore, in the present embodiment, a cross section of the fiber supply port portion 42 is formed to be constant in the direction perpendicular to the axial line A1 of the barrel 40. That is, the first opening 43 and the second opening 44 of the fiber supply port portion 42 have the shape and the same size. Furthermore, an edge of the first opening 43 and an edge of the second opening 44 are arranged to be superimposed on each other in the direction perpendicular to the axial line A1.

In another example, the first opening 43 and the second opening 44 of the fiber supply port portion 42 may have shapes different from each other. Alternatively, the openings may have the same shape and different sizes. Alternatively, the openings may have the same shape and the same size and may be arranged so that centers of the openings shift without being superimposed on each other in the direction perpendicular to the axial line A1.

Also when the fiber supply port portion 42 has such a shape, the maximum length L1 of the second opening 44 along the axial line A1 of the barrel 40 may only have the relation of $P \leq L1 \leq 2 \cdot P$, and the one end of the second opening 44 in the width direction W which is disposed in the first range R1 where the rotating direction of the screw 50 becomes the downward direction may only be located between a position distant as much as the distance $(R \cdot \sqrt{3}/2)$ from the axial line A1 and a position distant as much as the distance R from the axial line A1, including these two positions, in the planar view seen along the upward-downward direction G.

Figure 17:
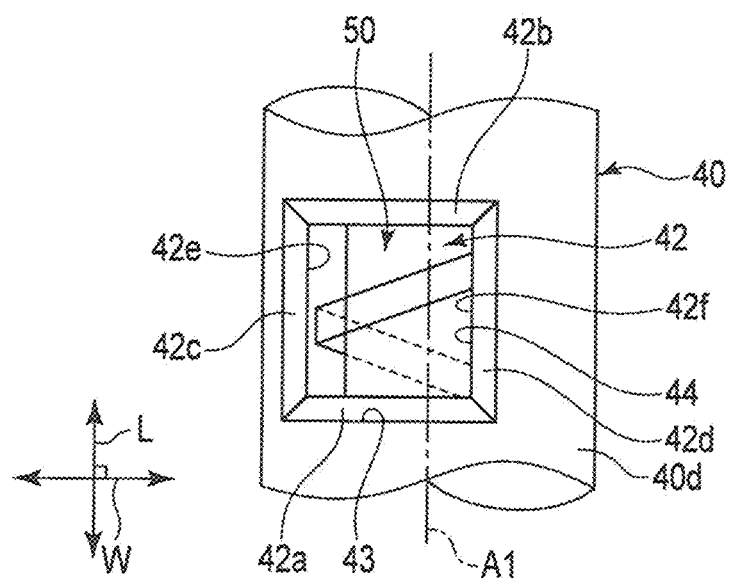
FIG. 17 is a plan view showing a modification of the barrel.
Figure 18:
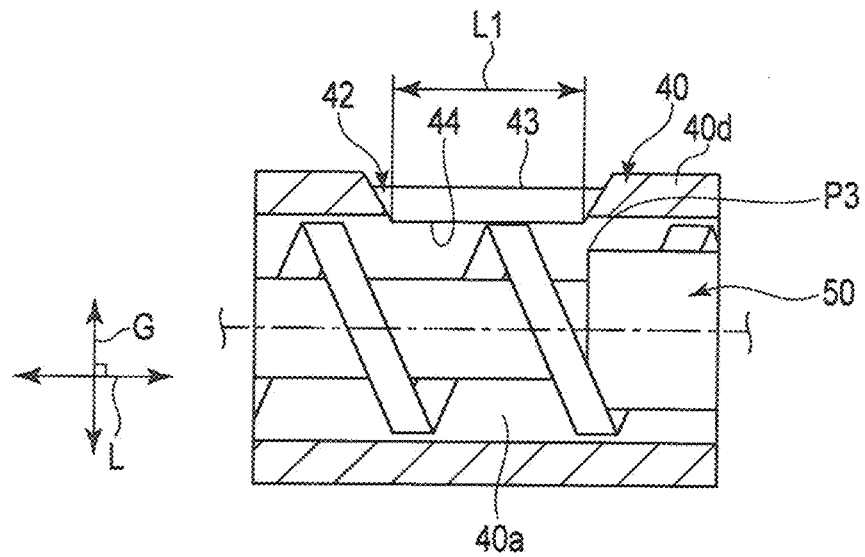
FIG. 18 is a cross-sectional view showing the modification of the barrel.
Figure 19:
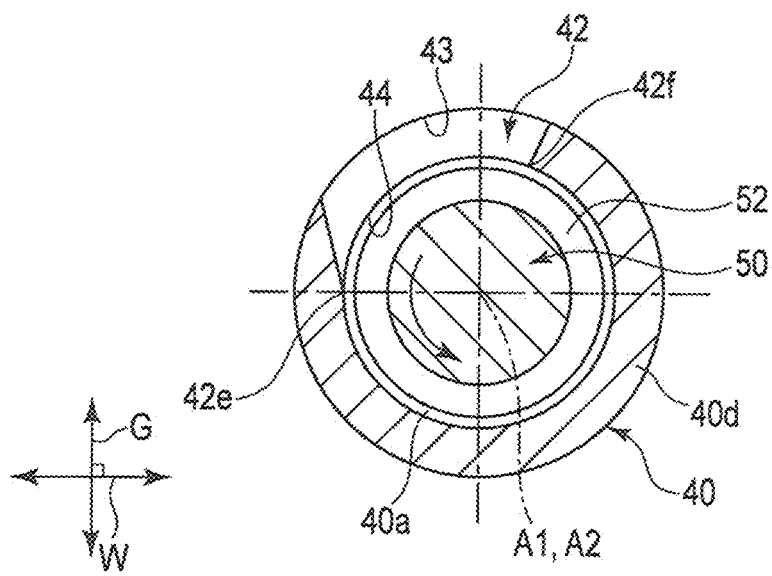
FIG. 19 is a cross-sectional view showing the modification of the barrel.

Each of FIGS. 17 to 19 shows one of the above other examples of the fiber supply port portion 42. FIG. 17 is a plan view showing a state where the fiber supply port portion 42 in which the first opening 43 and the second opening 44 have the same shape and different sizes is seen in the direction perpendicular to the axial line A1 of the barrel 40.

FIG. 18 is a cross-sectional view along the axial line A1 which shows the barrel 40 and the screw 50 shown in FIG. 17. FIG. 19 is a cross-sectional view showing that a state where the barrel 40 and the screw 50 shown in FIG. 17 are cut along a cross section perpendicular to the axial line A1 is seen from the proximal side toward the distal side.

As shown in FIGS. 17 to 19, the first opening 43 and the second opening 44 are rectangular. The first opening 43 is larger than the second opening 44. A center of the first opening 43 and a center of the second opening 44 are arranged to be superimposed in the direction perpendicular to the axial line A1. In other words, the first opening 43 is disposed coaxially with the second opening 44. Consequently, each of the inner surfaces 42a, 42b, 42c and 42d is formed as a tilted surface that tilts relative to the direction perpendicular to the axial line A1. The length L1 of the second opening 44 along the axial line A1 has the relation of P≤L1≤2·P.

Figure 20:
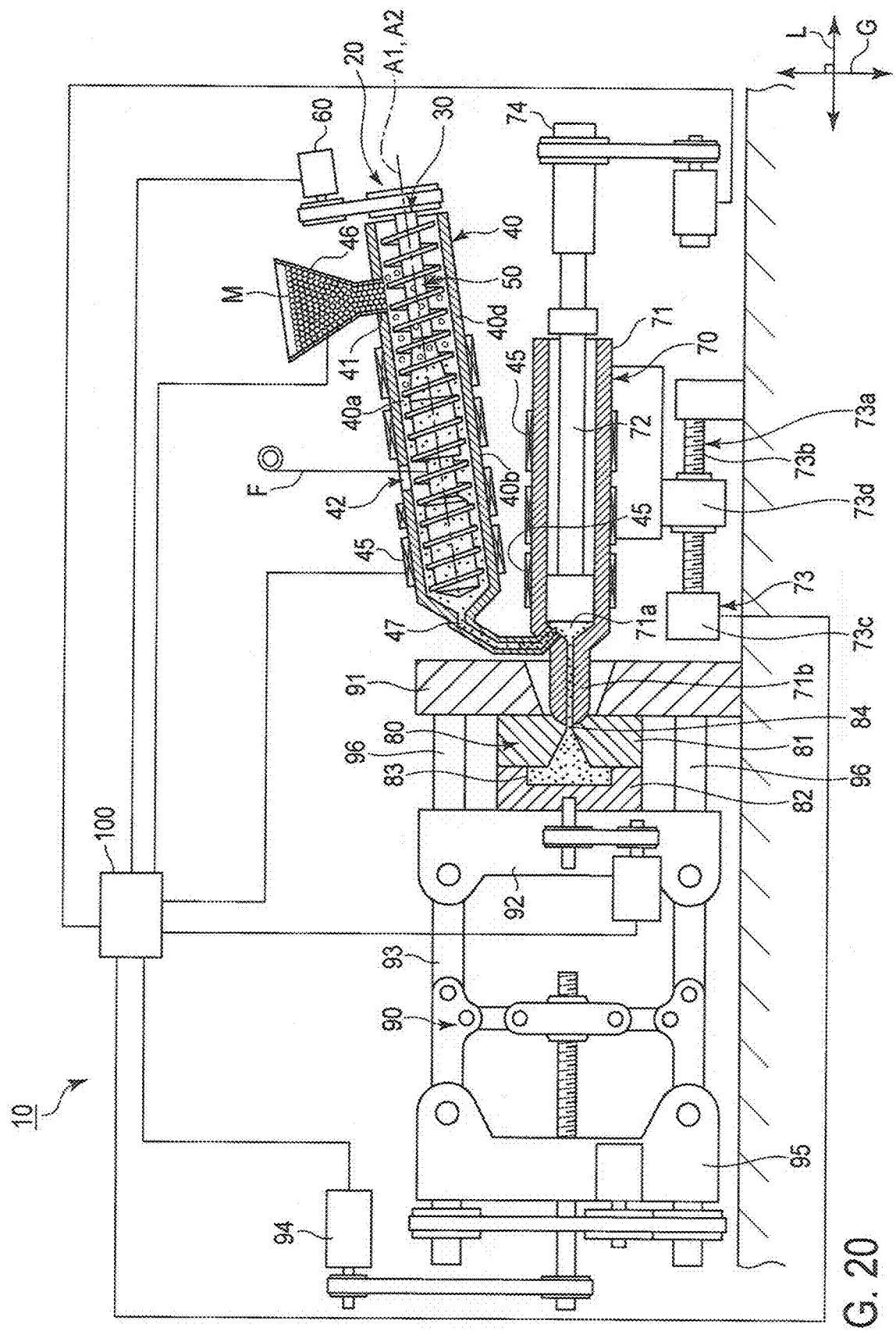
FIG. 20 is a side view showing a modification of a plasticizing device of the molding apparatus in a partially cut state.

Furthermore, FIG. 20 is a side view of the molding apparatus 10 showing a modification of the plasticizing device 30. As shown in FIG. 20, the plasticizing device 30 does not have a posture in which the axial line A1 of the barrel 40 is parallel to the horizontal direction, and may have a structure that tilts relative to the horizontal direction. Specifically, in the barrel 40, its axial line A1 tilts relative to the horizontal direction, and hence in a side plane view, the barrel constitutes a V-shape with the injecting section 70, and hence the barrel may be coupled with the injecting section 70.

In this manner, due to the structure in which the axial line A1 of the barrel 40 tilts relative to the horizontal direction and in the side plane view, the barrel forms the V-shape together with the injection cylinder 71 of the injecting section 70, the discharging section 47 does not have a right-angle shape.

When the discharging section 47 has the right-angle shape, a resistance of flow of the molten resin in the discharging section 47 increases, and retention of the molten resin in the discharging section 47 might easily occur. However, the discharging section 47 does not have to be formed into the right-angle shape as in the modification shown in FIG. 20, so that a fluidity of the molten resin including the fiber F of the reinforcing fiber in the discharging section 47 can improve.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A plasticizing device comprising:
   a barrel of a tubular shape comprising a resin material supply port portion which is formed in a peripheral wall portion and to which a resin material is supplied, and a fiber supply port portion which is formed on a distal side from the resin material supply port portion in the peripheral wall portion and to which a continuous fiber is supplied; and
   a screw that comprises a shaft body, and a flight of a spiral shape formed integrally on a peripheral surface of the shaft body, and is received in the barrel and rotating in a rotating direction,
   wherein the barrel is disposed with a posture in which its axial line intersects a gravitational direction,
   a maximum length of a rectangular opening in the barrel of the fiber supply port portion with two edges parallel to the axial line of the barrel is 1 time or more and 2 times or less as much as a pitch of the flight disposed in a portion of the screw which faces the rectangular opening in the barrel of the fiber supply port portion in a direction perpendicular to the axial line of the barrel.

2. The plasticizing device according to claim 1, wherein, in a planar view of the fiber supply port portion when the fiber supply port portion is seen in the gravitational direction, one end of the rectangular opening in the barrel of the fiber supply port portion in a width direction perpendicular to the axial line is located between a position distant as much as a distance $R(\sqrt{3}/2)$, in which R is an inner diameter of the barrel, from the axial line in the width direction and a position distant as much as a distance R from the axial in the width direction line, including these two positions, in a range where the rotating direction of the screw around the axial line becomes a downward direction along the gravitational direction.

3. The plasticizing device according to claim 2, wherein, in the planar view of the fiber supply port portion when the fiber supply port portion is seen in the gravitational direction, the one end of the rectangular opening in the barrel of the fiber supply port portion in the width direction is located at the position distant as much as the distance R from the axial line in the range where the rotating direction of the screw around the axial line becomes the downward direction along the gravitational direction.

4. The plasticizing device according to claim 2, wherein, in the planar view of the fiber supply port portion when the fiber supply port portion is seen in the gravitational direction, the other end of the fiber supply port portion in the width direction is located in a range where the rotating direction of the screw around the axial line becomes an upward direction along the gravitational direction.

5. The plasticizing device according to claim 3 wherein, in the planar view of the fiber supply port portion when the fiber supply port portion is seen in the gravitational direction, the other end of the fiber supply port portion in the width direction is located in a range where the rotating direction of the screw around the axial line becomes an upward direction along the gravitational direction.

6. The plasticizing device according to claim 1, wherein the screw comprises a supplying section, a compressing section, a measuring section, a fiber pull-in section, and a fiber kneading section, and the sections are arranged in order from a proximal end of the screw toward a distal end thereof,
   the fiber pull-in section faces the rectangular opening in the direction perpendicular to the axial line, and in the shaft body, a diameter of a portion in which the fiber pull-in section is formed is smaller than a diameter of a portion in which the measuring section is formed and a diameter of a portion in which the fiber kneading section is formed.

7. An injection device comprising:
   the plasticizing device according to claim 1;
   a discharging section connected to a distal end of the barrel; and
   an injecting section coupled with the discharging section and configured to inject a resin supplied through the discharging section, the resin being already molten and kneaded in the plasticizing device.

8. A molding apparatus comprising:
   the injection device according to claim 7; and
   a clamping device configured to clamp a mold into which the resin is injected by the injection device.

* * * * *